Sept. 28, 1943.  E. KOMENDA  2,330,595
LAMINATED BODY
Original Filed May 13, 1939
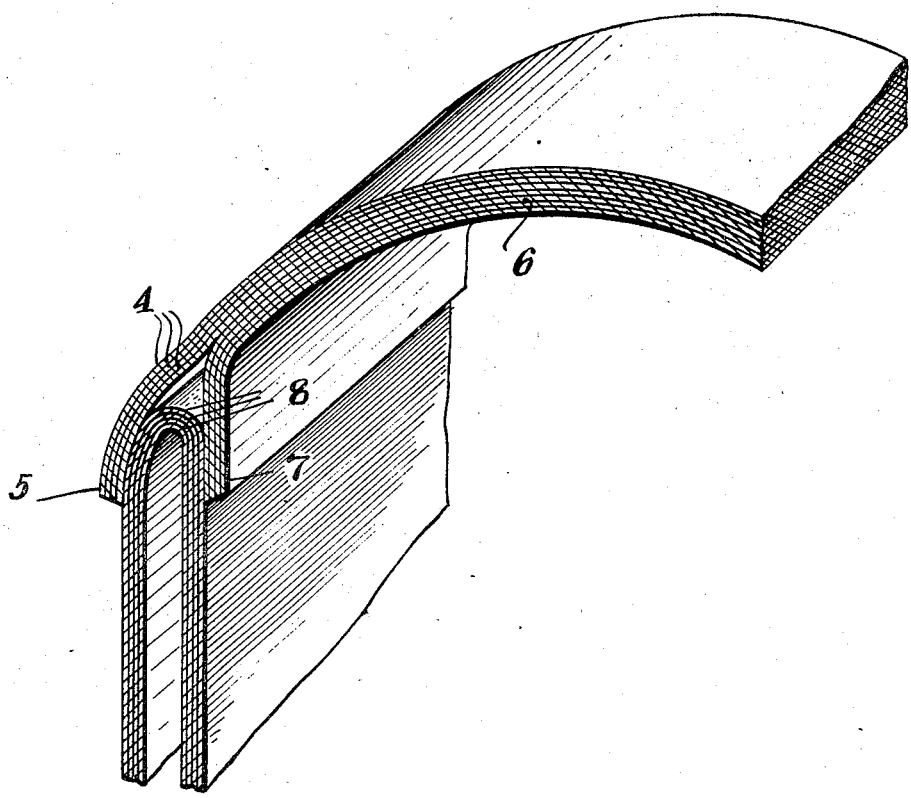
INVENTOR.
Erwin Komenda
BY
ATTORNEY Patented Sept. 28, 1943

2,330,595

UNITED STATES PATENT OFFICE 2,330,595

LAMINATED BODY

Erwin Komenda, Stuttgart-Korntal, Germany; vested in the Alien Property Custodian Original application May 13, 1939, Serial No. 273,397. Divided and this application May 21, 1941, Serial No. 394,450. In Germany May 14, 1938

1 Claim. (Cl. 296—137)

This invention relates to a laminated body, and more particularly to the construction of a vehicle body formed of laminated sheets of artificial material. The instant application is a division of my prior co-pending application Serial No. 273,397, filed May 13, 1939, and now abandoned.

An object of this invention is to provide an improved edged sheet of laminated artificial material.

Another object of this invention is the provision of an improved edged vehicle body part formed of laminated artificial material.

Still another object of this invention is to provide a novel roof structure for a vehicle body formed of laminated artificial material.

A more specific object of this invention is the provision of an edged roof structure for vehicle bodies of laminated artificial material, wherein the said edges are made as an integral continuation of the laminations of the main roof structure.

Other objects will become apparent from the following description taken in connection with the attached drawing showing an illustrative embodiment of the invention, wherein the single figure illustrates a transverse cross-section through the edge portion of the roof and side walls of a vehicle body.

In the form of invention herein illustrated showing half of a vehicle roof 6 formed of laminated artificial material, the laminated sheet 4 is split into two parts forming integral continuous roof edgings 5 and 7 which may surround the side wall of the vehicle, here shown as formed of a further folded laminated sheet of material 8.

A construction of this character not only permits a rigid and smooth interconnection between the roof and side wall, but in addition, the two ribs 5 and 7 act as longitudinal strengthening means for the sides of the vehicle. The remainder of the roof, that is, its central portion, may be formed flat or curved, or provided with a strengthening rib formed in accordance with the teachings of my above-identified parent co-pending application.

The laminated sheet forming the roof structure and also the side wall may be made in any known manner known to the art, such, for example, as from super-imposed layers of paper or fabric with layers of a phenol resin which has been heated and pressed together to form a laminated integral mass. Instead of phenol resin, cellulose, thiourea and similar compounds could readily be used.

Attention is directed to the fact that the integral connection between the edgings 5 and 7 of the roof 6 and the folded side wall 8 can be brought about by suitable application of heat and pressure, as will be well known to those skilled in this art.

Obviously, the principles of this invention are capable of many applications. For example, the roof edgings can be formed of laminated sheets of material which have been folded several times so that broad edgings of still greater strength will result. While the invention is particularly adaptable in the production of vehicle body parts, it may find use in the formation of other parts, particularly involving those of difficult shape. In all cases, however, there will result a part having high rigidity and strength, and one which is not easily splintered upon impact.

Accordingly, while I have herein shown and described only one embodiment of my present invention, it is to be understood that it is to be regarded merely as illustrative, and that I do not intend to limit myself thereto except as may be required by the following claim.

I claim:

In a vehicle, the combination of a roof composed of a plurality of layers of material, adhesively related, and having an edge providing co-acting jaws formed by splitting two sets of said layers from one another, thereby forming a throat, and a side wall composed of a plurality of layers of material adhesively related, and folded upon itself to produce parallel members connected by a semi-circular bend, said side wall being so related to said roof that said semi-circular bend is intruded into said throat so that the said jaws engage the parallel members of the side wall, the jaws and members being adhesively related.

ERWIN KOMENDA.